(12) United States Patent
Takano

(10) Patent No.: US 9,636,953 B2
(45) Date of Patent: May 2, 2017

(54) PNEUMATIC TIRE

(71) Applicant: SUMITOMO RUBBER INDUSTRIES, LTD., Kobe-shi, Hyogo (JP)

(72) Inventor: Hirokazu Takano, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 812 days.

(21) Appl. No.: 13/932,586

(22) Filed: Jul. 1, 2013

(65) Prior Publication Data

US 2014/0014244 A1 Jan. 16, 2014

(30) Foreign Application Priority Data

Jul. 10, 2012 (JP) .................................. 2012-154891

(51) Int. Cl.
*B60C 11/13* (2006.01)
*B60C 11/03* (2006.01)

(52) U.S. Cl.
CPC ...... *B60C 11/1315* (2013.04); *B60C 11/0306* (2013.04); *B60C 11/1323* (2013.04);
(Continued)

(58) Field of Classification Search
CPC ............. B60C 11/1315; B60C 11/1392; B60C 2011/0388; B60C 11/1323; B60C 2011/0346
See application file for complete search history.

(56) References Cited

U.S. PATENT DOCUMENTS 6,076,579 A * 6/2000 Matsumoto ......... B60C 11/0309
152/209.15
2002/0062892 A1* 5/2002 Himuro ............... B60C 11/0302
152/209.18
(Continued)

FOREIGN PATENT DOCUMENTS

JP 02-179508 A * 7/1990
JP 2001-206017 A * 7/2001
(Continued)

OTHER PUBLICATIONS

Translation for Japan 02-179508 (no date).*
Machine translation for Japan 2001-206017 (no date).*
Machine translation for Japan 2002-059711 (no date).*

*Primary Examiner* — Steven D Maki
(74) *Attorney, Agent, or Firm* — Birch, Stewart, Kolasch & Birch, LLP

(57) ABSTRACT

A pneumatic tire has a tread portion provided with a center land portion defined between two crown main grooves 3 extending continuously in the tire circumferential direction. The widthwise center line of the crown main groove is made up of successively-arranged circular arcs all oriented toward the same axial direction. The center land portion is provided in its both sides with sloping-surface portions each defined by a sloping surface extending from the radially outer surface of the center land portion to the axially inner groove-sidewall surface of one of the crown main grooves. Each of the sloping-surface portions includes, in its circumferential extent, the circumferential position of one of axially outermost points of the widthwise center line of the adjacent crown main groove.

11 Claims, 5 Drawing Sheets

(52) U.S. Cl.
CPC ... *B60C 11/1392* (2013.04); *B60C 2011/0346* (2013.04); *B60C 2011/0381* (2013.04); *B60C 2011/0388* (2013.04)

(56) References Cited

U.S. PATENT DOCUMENTS

| | | | | |
|---|---|---|---|---|
| 2002/0139460 | A1* | 10/2002 | Boiocchi | B60C 11/0302 152/209.2 |
| 2006/0162831 | A1* | 7/2006 | Ishida | B60C 11/0302 152/209.18 |
| 2013/0269846 | A1* | 10/2013 | Koyama | B60C 11/03 152/209.18 |
| 2013/0292017 | A1* | 11/2013 | Higuchi | B60C 11/0309 152/209.3 |
| 2014/0338804 | A1* | 11/2014 | Takano | B60C 11/1392 152/209.18 |

FOREIGN PATENT DOCUMENTS

| | | | |
|---|---|---|---|
| JP | 2002-059711 A | * | 2/2002 |
| JP | 2003-146018 A | | 5/2003 |

* cited by examiner

PNEUMATIC TIRE

BACKGROUND OF THE INVENTION

The present invention relates to a pneumatic tire, more particularly to a tread provided along a zigzag circumferential groove with sloping surface portions capable of improving the drainage performance without sacrificing the steering stability and noise performance.

In general, pneumatic tires for used on paved roads are provided with circumferentially continuously extending tread grooves. In order to improve the drainage performance, widely employed techniques are to increase the groove volume and to employ a linear groove configuration.

However, if a linear and wide circumferential groove is employed, there is a possibility that air column resonance occurs in such groove, and the noise performance is deteriorated.

If wide circumferential grooves are employed, there is a possibility that a land portion formed therebetween becomes relatively narrow in width and the rigidity is decreased, therefore, the steering stability is deteriorated.

SUMMARY OF THE INVENTION

It is therefore, an object of the present invention to provide a pneumatic tire in which the drainage performance can be improved without sacrificing the steering stability and noise performance.

According to the present invention, a pneumatic tire comprises a tread portion provided with a pair of circumferentially continuously extending crown main grooves disposed one on each side of the tire equator so as to form a center land portion defined between the crown main grooves, wherein each of the crown main grooves is a zigzag groove whose widthwise center line is made up of circular arcs successively arranged in the tire circumferential direction so that the widthwise center line has axially outermost points, the center land portion is provided in its both sides in the tire axial direction with sloping-surface portions each defined by a sloping surface extending from the radially outer surface of the center land portion to the axially inner groove-sidewall surface of one of the crown main grooves, and each of the sloping-surface portions includes, in its circumferential extent, the circumferential position of one of the axially outermost points of the widthwise center line of the adjacent crown main groove.

Therefore, the sloping-surface portions formed along the zigzag crown main groove, have a similar effect to the increasing of the volume of the crown main groove while the rigidity of the center land portion is maintained. Thus, the drainage and the steering stability can be improved in a well balanced manner. Because of the zigzag crown main groove, the groove sidewalls can disturb the propagation of sound waves, and air column resonance in the crown main groove is prevented not to deteriorate the noise performance.

The pneumatic tire according to the present invention may be provided with the following features (a)-(e):

(a) a peak-to-peak amplitude V2 of each axial edge of the radially outer surface of the center land portion is less than a peak-to-peak amplitude V1 of the widthwise center line of the adjacent crown main groove;

(b) the axial width W8 of each of the sloping-surface portions varies in the tire circumferential direction, and the maximum thereof lies at the circumferential position of one of the axially outermost points;

(c) in each side of the center land portion, non-sloping-surface portions are formed between the sloping-surface portions;

(d) a middle land portion abutting on the axially outer groove-sidewall surface of each of the crown main grooves is provided with axially outside sloping-surface portions each defined by an sloping surface extending from the radially outer surface of the middle land portion to the axially outer groove-sidewall surface of the crown main groove, and the axial width W9 of each of the axially outside sloping-surface portions varies in the tire circumferential direction;

(e) the circular arcs of the widthwise center line of each of the crown main grooves are each axially inwardly convexed.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

Definitions

Tread Edge Te:

The tread edges Te are the axial outermost edges of the ground contacting patch of the tire (camber angle=0) in the normally inflated loaded condition.

Tread Width TW:

The tread width TW is the axial distance between the tread edges Te measured in the normally inflated unloaded condition of the tire.

Sloping-surface Portion:

Given that, as shown in FIG. 5, in a cross section of a groove S perpendicular to the widthwise center line of the groove S, a sidewall surface of the groove S has a straight part S1 which occurs first in the course from the bottom Sh of the groove S to the tread surface 2A and has an inclination angle $\alpha 1$ and a part S2 which extends radially outwardly from the radial outer end Se of the straight part S1 up to the tread surface 2A and has, at the outer end Se, an inclination angle α2 larger than the inclination angle α1,
the part S2 is considered as a sloping-surface portion M.

Groove Width:

Unless otherwise noted, the width of a groove refers to that measured between the intersections of the sidewall surfaces of the groove with the tread surface or tread profile line in a cross section of the groove perpendicular to the widthwise center line of the groove. However, when the part S2 or sloping-surface portion M exists in the cross section of the groove, the width of the groove is defined using the intersection of an extended line of the straight part S1 with the tread profile line as shown in FIG. 3.

DESCRIPTION OF THE PREFERRED EMBODIMENTS

Embodiments of the present invention will now be described in detail in conjunction with the accompanying drawings.

The pneumatic tire 1 according to the present invention comprises a tread portion 2, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion 2 as usual.

In this embodiment, the pneumatic tire 1 is designed as an all-season tire for 4WD-car.

Figure 1:
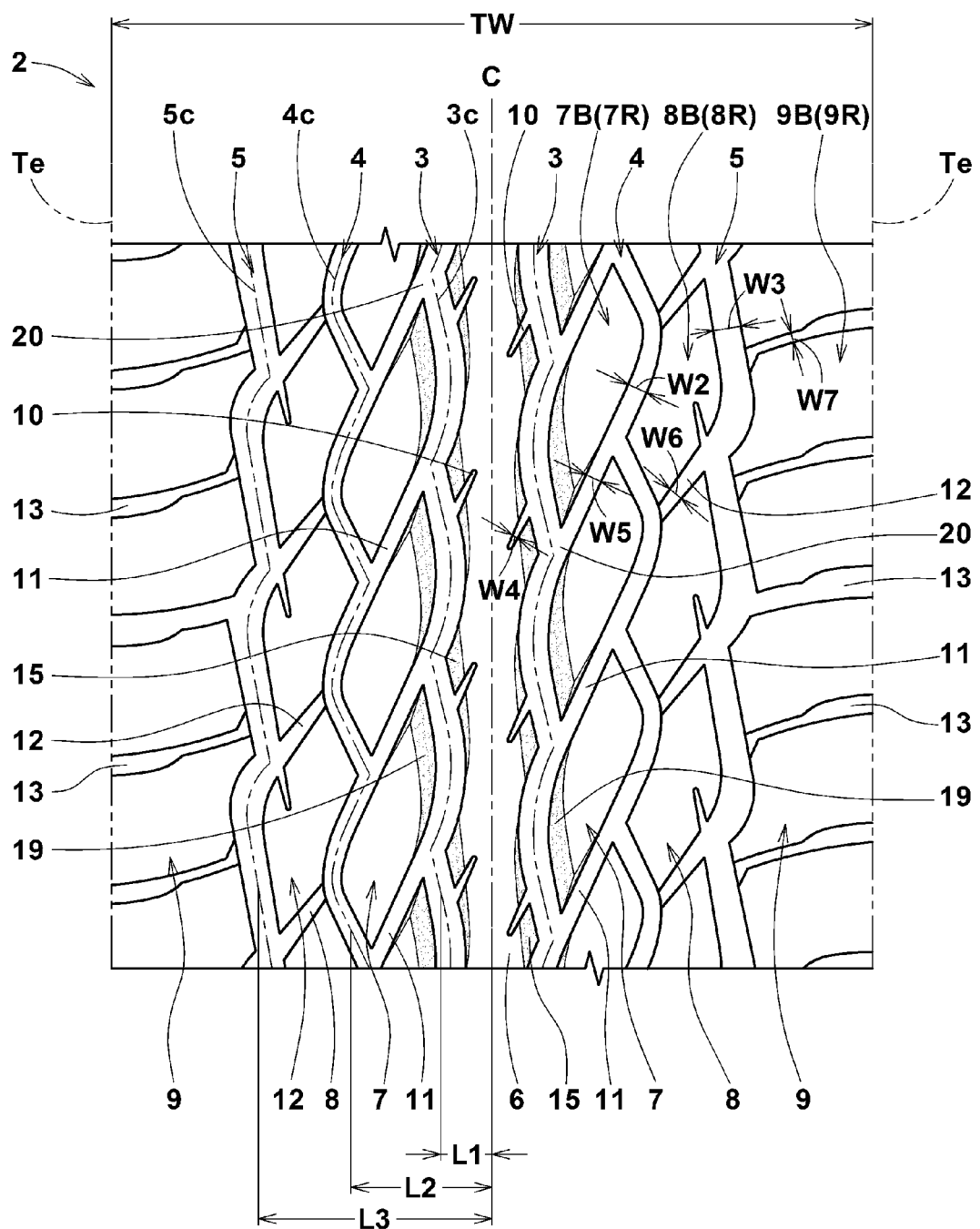
FIG. 1 is a developed partial view of the tread portion of a pneumatic tire as an embodiment of the present invention.

The tread portion 2 in this embodiment is, as shown in FIG. 1, provided on each side of the tire equator C with circumferentially continuously extending main grooves 5 which are an axially inner crown main groove 3, an axially outer shoulder main groove 5 and a middle main groove 4 therebetween. In the tread portion 2, therefore, there are formed a center land portion 6 between the two crown main grooves 3, a pair of axially inner middle land portions 7 between the main grooves 3 and 4, a pair of axially outer middle land portions 8 between the main grooves 4 and 5, and a pair of shoulder land portions 9 between the main grooves 5 and the tread edges Te.

The center land portion 6 is provided with crown lateral grooves 10 extending obliquely from each of the crown main grooves 3 toward the axially inside and terminating without reaching the tire equator C.

Since the center land portion 6 is provided with no groove other than the crown lateral grooves 10, the center land portion 6 is formed as a circumferentially continuously extending rib.

In this embodiment, all of the crown lateral grooves 10 are straight and extend in one direction.

The axially inner middle land portions 7 are each provided with axially inner middle lateral grooves 11 extending from the middle main groove 4 to the crown main groove 3 and arranged circumferentially of the tire at intervals so that the axially inner middle land portion 7 is divided into axially inner middle blocks 7B circumferentially arranged in a row 7R, In this embodiment, all of the axially inner middle lateral grooves 11 are straight and inclined in the same direction as the inclining direction of the crown lateral grooves 10.

The axially outer middle land portions 8 are each provided with axially outer middle lateral grooves 12 extending from the shoulder main groove 5 to the middle main groove 4 and arranged circumferentially of the tire at intervals so that the axially outer middle land portion 8 is divided into axially outer middle blocks 8B circumferentially arranged in a row 8R. In this embodiment, all of the axially outer middle lateral grooves 12 are straight and inclined to the same direction as the axially inner middle lateral grooves 11.

With respect to the tire axial direction, the inclining angle of the grooves 12 is less than the inclining angle of the grooves 11.

The shoulder land portions 9 are each provided with shoulder lateral grooves 13 extending from the shoulder main groove 5 to the tread edge Te and arranged circumferentially of the tire at intervals so that the shoulder land portion 9 is divided into shoulder blocks 9B circumferentially arranged in a row 9R.

In this embodiment, all of the shoulder lateral grooves 13 are inclined to the same direction as the axially outer middle lateral grooves 12.

With respect to the tire axial direction, the inclining angle of the grooves 13 is less than the inclining angle of the grooves 12.

In this embodiment, the tread pattern is, as shown in FIG. 1, substantially symmetrical about any point on the tire equator C excepting small displacements due to a variable pitching method if employed in the arrangement of the tread grooves and ground contacting tread elements.

With the increase in the width W1 of the crown main grooves 3, the rigidity of the center land portion 6 is decreased.

With the increase in the width W1 and depth D1 of the crown main groove 3, the possibility of air column resonance in the crown main groove 3 increases. Further, the steering stability tends to deteriorate.

With the decrease in the width W1 of the crown main groove 3, the resistance to water flow increases and the drainage performance is deteriorated.

Therefore, the width W1 of the crown main groove 3 is preferably set in a range of from 3.0 to 5.0% of the tread width TW, and the depth D1 of the crown main groove 3 is preferably set in a range of from 9.0 to 11.5 mm.

For similar reasons, the width W2 of the middle main groove 4 and the width W3 of the shoulder main groove 5 are preferably set in a range of from 1.5 to 5.5% of the tread width, and the depth of the middle main groove 4 and the depth of the shoulder main groove 5 are preferably set in a range of from 8.0 to 11.5 mm.

In order to improve the drainage performance, noise performance and steering stability in a well balanced manner, the widths W4-W7 of the lateral grooves 10-13, respectively, are preferably set in a range of from 0.5 to 5.0% of the tread width TW. The depths of the lateral grooves 10-13 are preferably set in a range of from 2.5 to 10.5 mm.

If the crown main groove 3 is disposed closely to the tire equator C, the rigidity of the center land portion 6 is decreased and the steering stability tends to deteriorate. If the crown main groove 3 is disposed far from the tire equator C, the drainage from the tread crown region becomes insufficient. Therefore, the axial distance L1 from the tire equator C to the widthwise center line 3c of the crown main groove 3 is set in a range of from 4 to 8% of the tread width TW.

In order to improve the drainage performance and the steering stability in a well balanced manner, the axial distance L2 from the tire equator C to the widthwise center line 4c of the middle main groove 4 is preferably set in a range of from 16 to 20% of the tread width TW.

The axial distance L3 from the tire equator C to the widthwise center line 5c of the shoulder main groove 5 is preferably set in a range of from 27 to 33% of the tread width TW.

When the widthwise center line 3c-5c is zigzag as in this embodiment, the above-mentioned axial distance L1-L3 is defined as measured from the tire equator C to the center of peak-to-peak amplitude of the widthwise center line 3c-5c.

Figure 2:
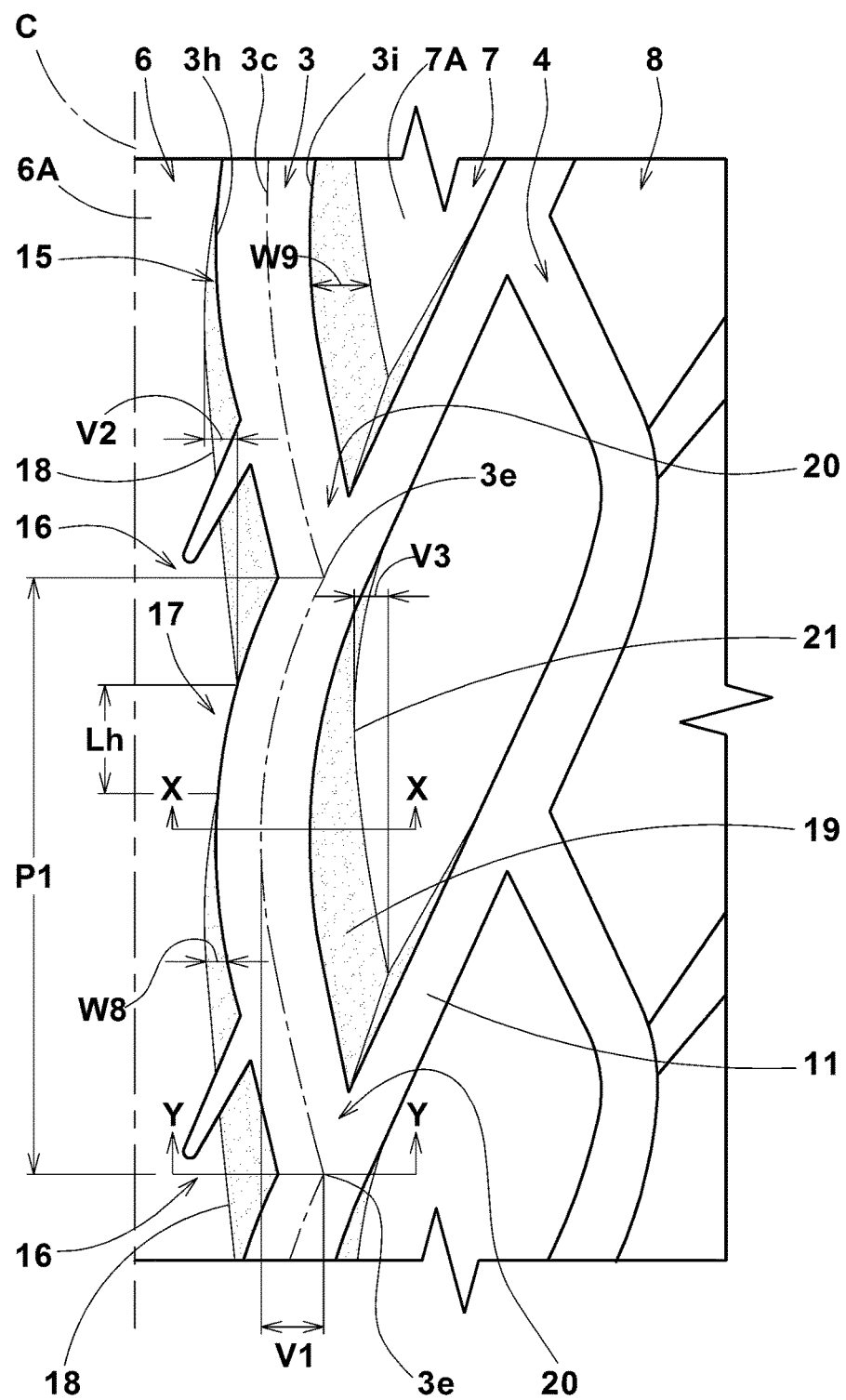
FIG. 2 is an enlarged view of the sloping-surface portions thereof.

As shown in FIG. 2, the widthwise center line 3c of the crown main groove 3 is made up of successively-arranged circular arcs all oriented toward the same tire axial direction.

Thus, during rolling, the zigzag groove sidewalls disturb the propagation of sound waves, and air column resonance in the crown main groove 3 is prevented not to deteriorate the noise performance.

The circular arcs are preferably axially inwardly convexed in order to increase the strength of the center land portion 6 and improve the drainage toward the axially outside.

The peak-to-peak amplitude V1 of the widthwise center line 3c of the crown main groove 3 is preferably set in a range of not less than 4%, more preferably not less than 5%, but not more than 10%, more preferably not more than 9% of a circumferential pitch length P1 of zigzag of the widthwise center line 3c in order to optimize the degree of curving of the crown main groove 3 for the drainage performance and the noise performance improved in a well balanced manner.

Figure 3:
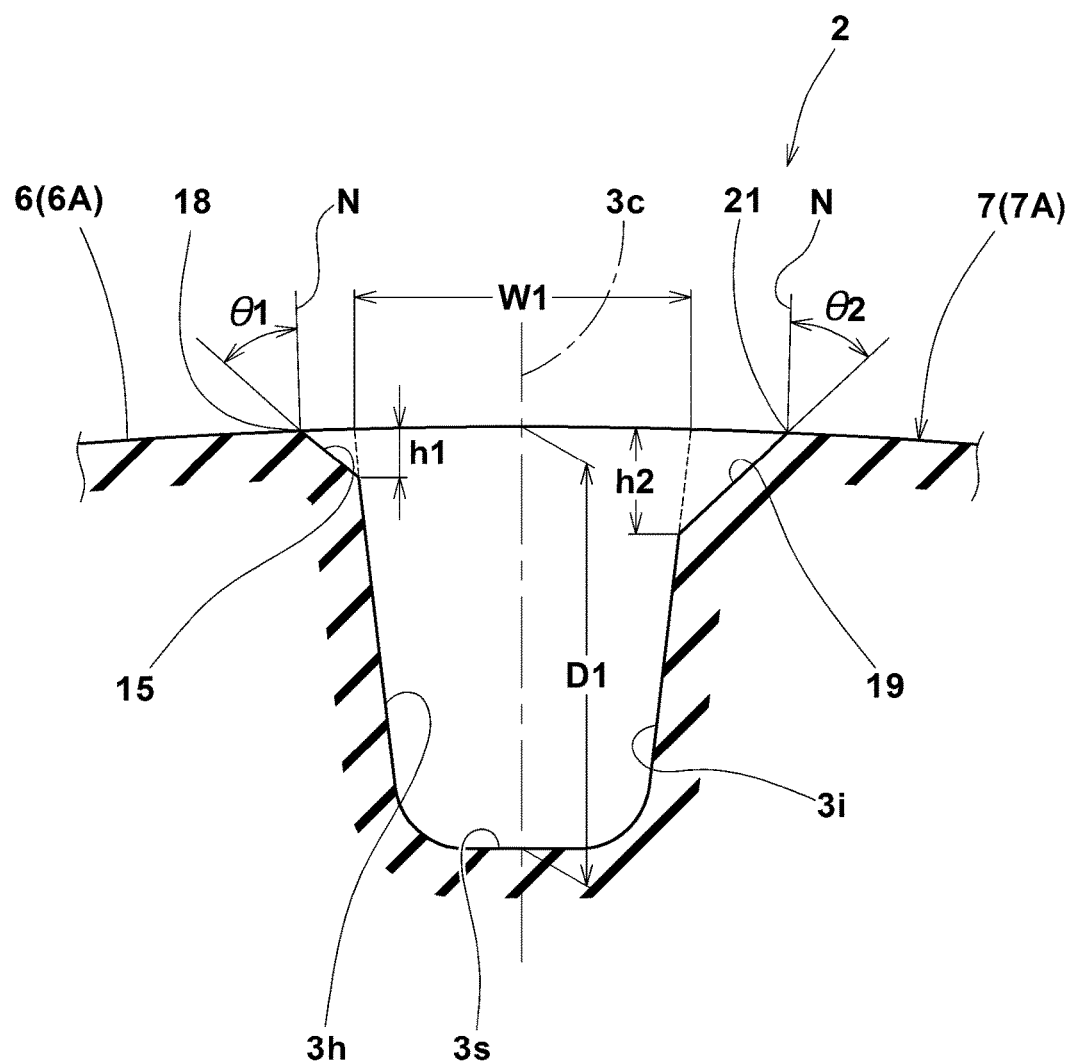
FIG. 3 is a cross sectional view of the crown main groove taken along line X-X in FIG. 2.

According to the present invention, as shown in FIG. 2 and FIG. 3, the top face of the center land portion 6 is provided with sloping-surface portions 15.

The sloping-surface portion 15 is defined by a sloping surface extending from the radially outer surface 6A of the center land portion 6 to the axially inner groove-sidewall surface 3h of the crown main groove 3.

The provision of the sloping-surface portions 15 has a similar effect to the increasing of the volume of the crown main grooves 3 while the rigidity of the center land portion 6 is maintained. Thus, the drainage and the steering stability can be improved in a well balanced manner.

Further, in each side of the center land portion 6, non-sloping-surface portions 17 are formed between the sloping-surface portions 15. In other words, the sloping-surface portions 15 are formed intermittently in the tire circumferential direction.

As shown in FIG. 2, each of the sloping-surface portions 15 (shaded regions 16) includes, within its circumferential extent, the circumferential position of one of the axially outermost points 3e of the widthwise center line 3c of the crown main groove 3. In other words, each sloping-surface portion 15 extends from the circumferential position of one of the axially outermost points 3e toward both sides in the tire circumferential direction.

Since the drainage tends to decrease in the vicinity of the axially outermost point 3e, the sloping-surface portion 15 is provided in order to cover such decrease.

The axial width W8 of each of the sloping-surface portions 15 varies in the tire circumferential direction such that the axial width W8 is gradually decreased from the circumferential position of the above-mentioned axially outermost point 3e toward each of the circumferential ends of the sloping-surface portion 15.

Therefore, between the sloping-surface portions 15 and the non-sloping-surface portions 17, the change in the rigidity of the center land portion 6 is reduced, and the occurrence of uneven wear can be prevented.

Preferably, the maximum of the axial width W8 lies at the circumferential position of the axially outermost point 3e. With the increase in the width W8, the radially outer surface of the center land portion 6 becomes narrow and the steering stability tends to deteriorate. Therefore, the maximum is preferably set in a range of not less than 1.5%, more preferably not less than 2.0%, but not more than 4%, more preferably not more than 3% of the tread width TW.

As shown in FIG. 3, the angle θ1 of the sloping-surface portions 15 with respect to the normal direction N to the radially outer surface 6A of the center land portion 6 is preferably set in a range of not less than 30 degrees, more preferably not less than 35 degrees, but not more than 60 degrees, more preferably not more than 55 degrees.

In each of the sloping-surface portions 15, the angle θ1 may be constant in the tire circumferential direction or variable within the above-mentioned range.

As shown in FIG. 3, the depth h1 of the sloping-surface portions 15 (which is the radial distance from the tread profile line to the intersection between the sloping-surface portions 15 and the axially inner groove-sidewall surface 3h of the crown main groove 3) is preferably set in a range of not more than 50%, more preferably not more than 45% of the depth D1 of the crown main groove 3 in order to maintain necessary rigidity of the center land portion 6 and to prevent the occurrence of air column resonance.

Figure 4:
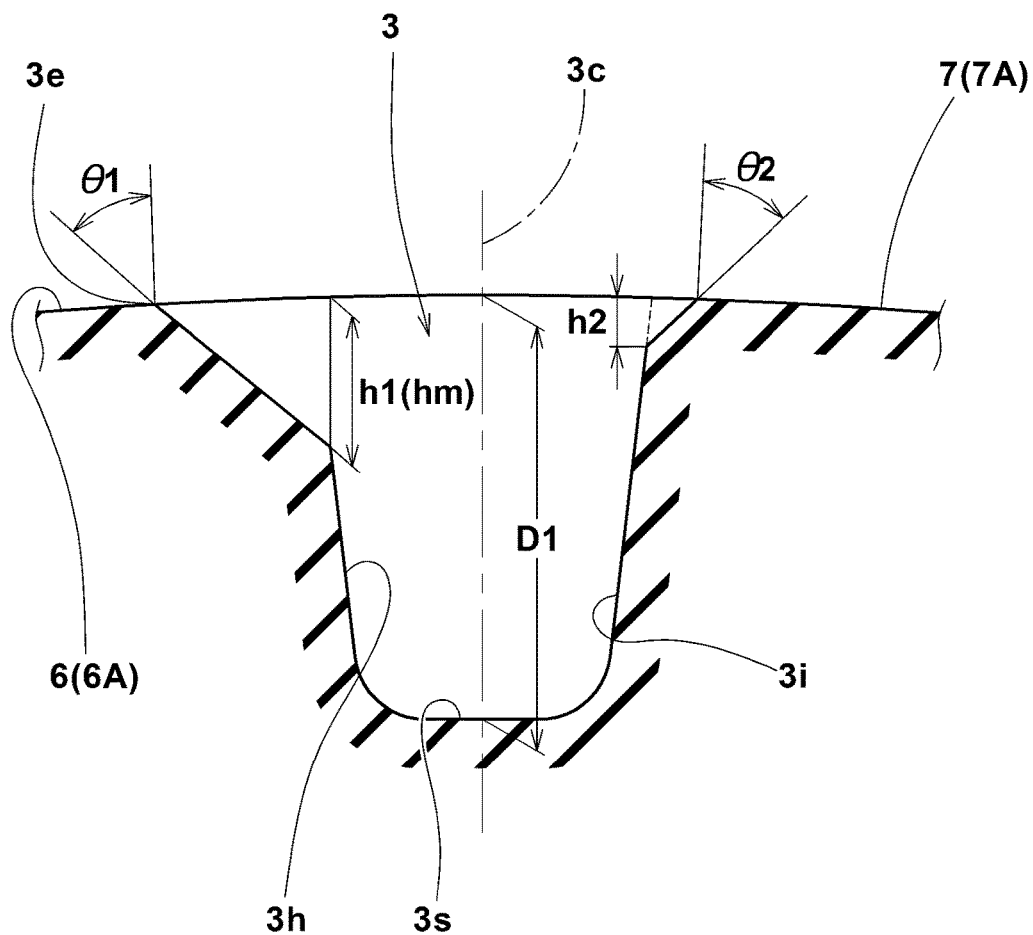
FIG. 4 is a cross sectional view of the crown main groove taken along line Y-Y in FIG. 2.
Figure 5:
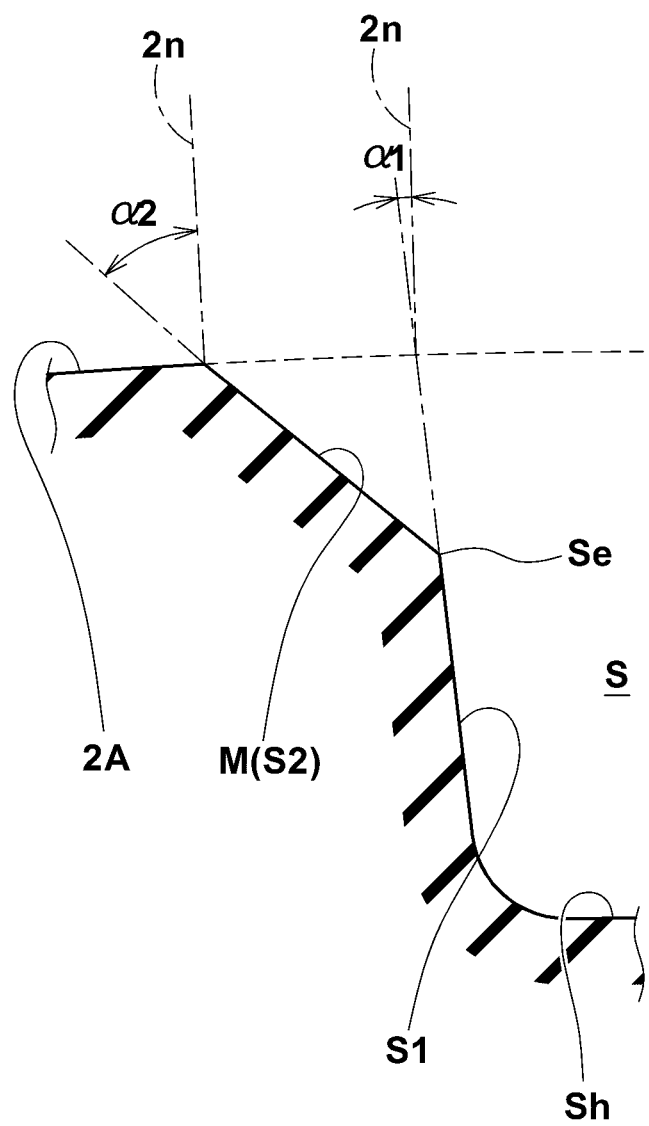
FIG. 5 is a cross sectional view for explaining the sloping-surface portion.

But, in order to prevent uneven wear of the center land portion 6 at the circumferential positions of the axially outermost points 3e and also improve the drainage performance, as shown in FIG. 4, at the circumferential position of the axially outermost point 3e, the depth (hm) of the sloping-surface portions 15 is preferably set in a range of not less than 35%, more preferably not less than 40% of the depth D1 of the crown main groove 3.

As shown in FIG. 2, owing to the provision of the sloping-surface portions 15, the peak-to-peak amplitude V2 of each of the edges 18 of the radially outer surface 6A of the center land portion 6 becomes less than the peak-to-peak amplitude V1 of the widthwise center line 3c of the crown main groove 3.

Therefore, the variation in the tire circumferential direction, of the rigidity of the center land portion 6 is decreased, and the drainage toward the tire circumferential direction is furthered.

If the peak-to-peak amplitude V2 of the edge 18 is excessively smaller than the peak-to-peak amplitude V1 of the widthwise center line 3c, it becomes difficult to reduce the occurrence of the air column resonance deteriorating the noise performance. Therefore, the ratio V2/V1 of the peak-to-peak amplitude V2 to the peak-to-peak amplitude V1 is preferably set in a range of not less than 0.40, more preferably not less than 0.45, but not more than 0.70, more preferably not more than 0.65. Further, the peak-to-peak amplitude V2 is preferably set in a range of from 1% to 3% of the tread width TW.

In the center land portion 6, since the non-sloping-surface portions 17 alternate with the sloping-surface portions 15, the center land portion 6 can maintain a wide ground contacting area while maintaining a small volume of the crown main groove 3, therefore, the steering stability and noise performance are improved.

For that purpose, the circumferential length (Lh) of each of the non-sloping-surface portions 17 is preferably set in a range of not less than 10%, more preferably not less than 15%, but not more than 30%, more preferably not more than 25% of a circumferential pitch length P1 of zigzag of the widthwise center line 3c of the crown main groove 3.

If the circumferential length (Lh) is increased more than 30%, since the sloping-surface portions 15 become small, it becomes difficult to improve the drainage performance.

In this embodiment, each of the axially inner middle land portions 7 is also provided with axially outside sloping-surface portions 19 as shown in FIG. 3.

The axially outside sloping-surface portions 19 are each defined by a sloping surface extending from the radially outer surface 7A of the axially inner middle land portion 7 to the axially outer groove-sidewall surface 3i of the crown main groove 3.

The provision of the axially outside sloping-surface portions 19 has a similar effect to the increasing of the volume of the crown main grooves 3 while maintaining the rigidity of the axially inner middle land portion 7. Thus, the drainage and the steering stability can be improved in a well balanced manner.

As shown in FIG. 2, the axial width W9 of each the axially outside sloping-surface portions 19 varies in the tire circumferential direction. More specifically, the axial width W9 of each of the axially outside sloping-surface portions 19 is gradually decreased toward each of the circumferential ends of the axially outside sloping-surface portion 19 from a circumferential position therebetween.

Therefore, the variation in the tire circumferential direction, of the rigidity of the axially inner middle land portion 7 (as a whole of blocks 7B) is reduced to improve the steering stability.

The peak-to-peak amplitude V3 of the axial inner edge 21 of the radially outer surface 7A of the axially inner middle land portion 7 as a whole of the blocks 7B is set in a range of from 1 to 3% of the tread width TW in order to further improve the noise performance and the drainage.

As shown in FIG. 3, the angle θ2 of the axially outside sloping-surface portion 19 with respect to the normal direction N to the radially outer surface 7A of the axially inner middle land portion 7 is preferably set in a range of not less than 30 degrees, more preferably not less than 35 degrees, but not more than 60 degrees, more preferably not more than 55 degrees.

The depth h2 of the axially outside sloping-surface portions 19 (which is the radial distance from the tread profile line to the intersection between the axially outside sloping-surface portions 19 and the axially outer groove-sidewall surface 3i of the crown main groove 3) is preferably not more than 45%, more preferably not more than 40% of the depth D1 of the crown main groove 3 in order to maintain necessary rigidity of the axially inner middle land portion 7 and to prevent the occurrence of air column resonance.

Further, as shown in FIG. 1, the widthwise center line 4c of the middle main groove 4 and the widthwise center line 5c of the shoulder main groove 5 each include arcs arranged at intervals in the circumferential direction.

In the middle main grooves 4 and the shoulder main grooves 5, therefore, their zigzag groove sidewalls can disturb the propagation of sound waves, and air column resonance in the main groove 4, 5 is prevented to improve the noise performance.

In this embodiment, the arcs of the widthwise center line 4c of the middle main groove 4 are axially outwardly convexed. The arcs of the widthwise center line 5c of the shoulder main groove 5 are axially outwardly convexed.

The above-mentioned axially inner middle lateral grooves 11 extend between the intersecting points between the arcs of the widthwise center line 4c of the middle main groove 4 and the intersecting points between the circular arcs of the widthwise center line 3c of the crown main groove 3 so as to connect each of the arcs to one of the circular arcs in line.

The above-mentioned axially outer middle lateral grooves 12 extend between the intersecting points between the arcs of the widthwise center line 5c of the shoulder main groove 5 and axially outermost points of the respective arcs of the widthwise center line 4c of the middle main groove 4.

The above-mentioned shoulder lateral grooves 13 extend from the shoulder main groove 5 to the tread edge Te such that two of them extend from each of the arcs of the widthwise center line 5c of the shoulder main groove 5.

The above-mentioned crown lateral grooves 10 are arranged so as to extend across the sloping-surface portions 15 respectively.

Comparison Tests

Pneumatic tires of size 275/55R20 (rim size: 20×9.0JJ) having tread patterns based on that shown in FIG. 1 were prepared and tested for the drainage, steering stability and noise performance.

Specifications of the tread patterns are shown in Table 1.
Common Specifications are as Follows:
Tread width TW: 225 mm
Crown Main Groove
   depth: 10.9 mm
   distance L1: 5.0% to 7.7% of TW
Middle Main Groove
   depth: 9.9 mm
   distance L2: 15.9% to 20.6% of TW
Shoulder Main Groove
   depth: 10.9 mm
   distance L3: 28.6% to 31.5% of TW
Crown Lateral Groove
   depth: 3.2 mm
Axially Inner Middle Lateral Groove
   depth: 8.1 mm
Axially Outer Middle Lateral Groove
   depth: 9.9 mm
Shoulder Lateral Groove
   depth: 9.5 mm
Outside Sloping-Surface Portion
   angle θ2: 45 degrees
   max depth h2: 45% of D1
Axially Inner Middle Land Portion
   peak-to-peak amplitude V3: 2% of TW (but 0% in Ex.15)

In the drainage test, a 4300 cc 4WD SUV provided on the four wheels with test tires (tire pressure 240 kPa) was run on a wet asphalt road surface covered with 5 mm depth water at a speed of 60 km/h, and running stability was evaluated by the test driver.

In the steering stability test, the SUV was run on a dry asphalt road surface in a tire test course, and steering stability was evaluated by the test driver based on the road grip, rigid feeling and steering response during cornering.

In the noise performance test, the SUV was coasted on a roughened surface road at a speed of 60 km/h, and road noise was evaluated by the test driver.

The test results are shown in Table 1 by an index based on comparative example tire Ref.1 being 100. The larger the index number, the better the performance.

TABLE 1

| Tire | Ref. 1 | Ex. 1 | Ex. 2 | Ex. 3 | Ex. 4 | Ex. 5 |
|---|---|---|---|---|---|---|
| sloping-surface portions provided? | No | Yes | Yes | Yes | Yes | Yes |
| peak-to-peak amplitude V2/V1 (%) | — | 52 | 20 | 40 | 70 | 100 |
| sloping-surface portions' depth (max) hm/D1(%) | — | 45 | 45 | 45 | 45 | 45 |
| sloping-surface portions' angle θ1 (deg.) | — | 45 | 45 | 45 | 45 | 45 |
| outside sloping-surface portion provided? | No | Yes | Yes | Yes | Yes | Yes |
| peak-to-peak amplitude V1/pitch P1(%) | — | 6 | 6 | 6 | 6 | 6 |
| peak-to-peak amplitude V2/TW(%) | — | 2 | 2 | 2 | 2 | 2 |
| drainage | 100 | 100 | 102 | 98 | 95 | 90 |
| steering stability | 100 | 100 | 102 | 102 | 95 | 90 |
| noise performance | 100 | 120 | 110 | 115 | 125 | 130 |

| Tire | Ex. 6 | Ex. 7 | Ex. 8 | Ex. 9 | Ex. 10 | Ex. 11 |
|---|---|---|---|---|---|---|
| sloping-surface portions provided? | Yes | Yes | Yes | Yes | Yes | Yes |
| peak-to-peak amplitude V2/V1 (%) | 52 | 52 | 52 | 52 | 52 | 52 |
| sloping-surface portions' depth (max) hm/D1(%) | 60 | 50 | 35 | 45 | 45 | 20 |
| sloping-surface portions' angle θ1 (deg.) | 45 | 45 | 45 | 20 | 30 | 45 |
| outside sloping-surface portion provided? | Yes | Yes | Yes | Yes | Yes | Yes |
| peak-to-peak amplitude V1/pitch P1(%) | 6 | 6 | 6 | 6 | 6 | 6 |
| peak-to-peak amplitude V2/TW(%) | 2 | 2 | 2 | 2 | 2 | 2 |
| drainage | 105 | 103 | 95 | 98 | 99 | 90 |
| steering stability | 95 | 98 | 102 | 102 | 101 | 104 |
| noise performance | 110 | 118 | 122 | 110 | 115 | 122 |

| Tire | Ex. 12 | Ex. 13 | Ex. 14 | Ex. 15 | Ex. 16 | Ex. 17 |
|---|---|---|---|---|---|---|
| sloping-surface portions provided? | Yes | Yes | Yes | Yes | Yes | Yes |
| peak-to-peak amplitude V2/V1 (%) | 52 | 52 | 52 | 52 | 52 | 52 |
| sloping-surface portions' depth (max) hm/D1(%) | 45 | 45 | 45 | 45 | 45 | 45 |
| sloping-surface portions' angle θ1 (deg.) | 60 | 70 | 45 | 45 | 45 | 45 |
| outside sloping-surface portion provided? | Yes | Yes | No | Yes | Yes | Yes |
| peak-to-peak amplitude V1/pitch P1(%) | 6 | 6 | 6 | 0 | 2 | 4 |
| peak-to-peak amplitude V2/TW(%) | 2 | 2 | 2 | 0 | 2 | 2 |
| drainage | 103 | 103 | 100 | 100 | 105 | 102 |
| steering stability | 95 | 92 | 100 | 90 | 105 | 102 |
| noise performance | 118 | 120 | 115 | 120 | 100 | 110 |

| Tire | Ex. 18 | Ex. 19 | Ex. 20 | Ex. 21 | Ex. 22 | Ex. 23 |
|---|---|---|---|---|---|---|
| sloping-surface portions provided? | Yes | Yes | Yes | Yes | Yes | Yes |
| peak-to-peak amplitude V2/V1 (%) | 52 | 52 | 52 | 52 | 52 | 52 |
| sloping-surface portions' depth (max) hm/D1(%) | 45 | 45 | 45 | 45 | 45 | 45 |
| sloping-surface portions' angle θ1 (deg.) | 45 | 45 | 45 | 45 | 45 | 45 |
| outside sloping-surface portion provided? | Yes | Yes | Yes | Yes | Yes | Yes |
| peak-to-peak amplitude V1/pitch P1(%) | 10 | 15 | 6 | 6 | 6 | 6 |
| peak-to-peak amplitude V2/TW(%) | 2 | 2 | 0 | 1 | 3 | 5 |
| drainage | 95 | 93 | 95 | 98 | 102 | 105 |
| steering stability | 98 | 95 | 105 | 103 | 95 | 90 |
| noise performance | 121 | 123 | 110 | 118 | 122 | 123 |

The invention claimed is:

1. A pneumatic tire comprising a tread portion provided with a pair of circumferentially continuously extending crown main grooves disposed one on each side of the tire equator so as to form a center land portion defined between the crown main grooves, and a circumferentially continuously extending middle main groove disposed adjacently to and on the axially outside of each of the crown main grooves, wherein each of the crown main grooves is a zigzag groove whose widthwise center line is made up of circular arcs successively arranged in the tire circumferential direction so that the widthwise center line has axially outermost points, each of the middle main grooves is a zigzag groove whose widthwise center line is made up of arcs successively arranged in the tire circumferential direction, the arcs of the widthwise center line of each of the middle main grooves project axially outwards, the arcs of the widthwise center line of each of the crown main grooves project axially inwards, the center land portion is provided in its both sides in the tire axial direction with sloping-surface portions each defined by a sloping surface extending from the radially outer surface of the center land portion to the axially inner groove-sidewall surface of one of the crown main grooves, each of the sloping-surface portions includes, in its circumferential extent, the circumferential position of one of the axially outermost points of the widthwise center line of the adjacent crown main groove, and a middle land portion abutting on the axially outer groove-sidewall surface of each of the crown main grooves is provided with axially outside sloping-surface portions each defined by a sloping surface extending from the radially outer surface of the middle land portion to the axially outer groove-sidewall surface of the crown main groove, whereas an edge of the middle land portion abutting on the axially inner groove-sidewall surface of the adjacent middle main groove is not provided with a sloping-surface portion.

2. The pneumatic tire according to claim 1, wherein a peak-to-peak amplitude of each axial edge of the radially outer surface of the center land portion is less than a peak-to-peak amplitude of the widthwise center line of the adjacent crown main groove.

3. The pneumatic tire according to claim 2, wherein in each side of the center land portion, non-sloping-surface portions are formed between the sloping-surface portions.

4. The pneumatic tire according to claim 3, wherein the axial width of each of the axially outside sloping-surface portions varies in the tire circumferential direction.

5. The pneumatic tire according to claim 2, wherein the axial width each of the sloping-surface portions varies in the tire circumferential direction, and the maximum thereof lies at the circumferential position of one of the axially outermost points.

6. The pneumatic tire according to claim 2, wherein the axial width of each of the axially outside sloping-surface portions varies in the tire circumferential direction.

7. The pneumatic tire according to claim 1, wherein the axial width of each of the sloping-surface portions varies in the tire circumferential direction, and the maximum thereof lies at the circumferential position of one of the axially outermost points.

8. The pneumatic tire according to claim 7, wherein in each side of the center land portion, non-sloping-surface portions are formed between the sloping-surface portions.

9. The pneumatic tire according to claim 7, wherein the axial width of the axially outside sloping-surface portions in the tire circumferential direction.

10. The pneumatic tire according to claim 1, wherein the axial width of each of the axially outside sloping-surface portions varies in the tire circumferential direction.

11. The pneumatic tire according to claim 1, wherein the tread portion is provided with a circumferentially continuously extending shoulder main groove disposed adjacently to and on the axially outside of each of the middle main grooves, each of the shoulder main grooves is a zigzag groove whose widthwise center line is made up of arcs successively arranged in the tire circumferential direction, and the arcs of the widthwise center line of each of the shoulder main grooves project axially outwards.

* * * * *